United States Patent [19]

Yamamoto

[11] Patent Number: 5,029,937
[45] Date of Patent: Jul. 9, 1991

[54] ROOF SYSTEM FOR VEHICLE

[75] Inventor: Kazuhisa Yamamoto, Hiroshima, Japan

[73] Assignee: Mazda Motor Corporation, Hiroshima, Japan

[21] Appl. No.: 469,337

[22] Filed: Jan. 24, 1990

[30] Foreign Application Priority Data

Jan. 25, 1989 [JP] Japan .................................. 1-16556

[51] Int. Cl.⁵ .......................... B60J 7/047; B60J 7/057
[52] U.S. Cl. .................................... 296/223; 296/216; 296/220; 49/127; 49/130
[58] Field of Search ............... 296/216, 220, 222, 223; 49/125, 127, 130

[56] References Cited

FOREIGN PATENT DOCUMENTS

| | | | |
|---|---|---|---|
| 3801881 | 8/1988 | Fed. Rep. of Germany | 296/220 |
| 3802380 | 8/1988 | Fed. Rep. of Germany | 296/220 |
| 62-255222 | 11/1987 | Japan . | |
| 133974 | 6/1929 | Switzerland | 296/216 |
| 349940 | 5/1931 | United Kingdom | 296/216 |
| 362167 | 12/1931 | United Kingdom | 296/216 |

*Primary Examiner*—Dennis H. Pedder
*Attorney, Agent, or Firm*—Sixbey, Friedman, Leedom & Ferguson

[57] ABSTRACT

A roof system for a vehicle has forward and rearward roof windows. The forward roof window is opened and closed by means of a sliding roof member. The sliding roof member can slide beyond the rearward roof window when the forward roof window is open.

12 Claims, 9 Drawing Sheets

ROOF SYSTEM FOR VEHICLE

BACKGROUND OF THE INVENTION

1. Field of the Invention

This invention relates to a roof system for a vehicle, and more particularly to a roof system for a vehicle which is provided with a plurality of roof windows.

2. Description of the Prior Art

Certain types of vehicles, such as wagons, are sometimes provided with a plurality of roof windows. For example, the roof system disclosed in Japanese Unexamined Patent Publication No. 62-255222 is provided with a forward roof window and a rearward roof window. The forward roof window is provided with a forward sliding roof member which slides rearward and tilts up over the roof panel between the forward and rearward roof windows to open the forward roof window. The rearward roof window is provided with a rearward sliding roof member which slides rearward below the roof panel on the rear side of the rearward roof window.

Such a roof system is disadvantageous in that when the forward sliding roof member is in the rearward position or the open position, the forward sliding roof member partly covers the rearward roof window and lessens the feeling of openness for the rear seat passengers. This is because the forward sliding roof member is generally longer than the distance between the forward and rearward roof windows.

SUMMARY OF THE INVENTION

In view of the foregoing observations and description, the primary object of the present invention is to provide a roof system for a vehicle having forward and rearward roof windows, at least one of the forward and rearward roof windows being opened and closed by means of a sliding roof member, in which the other roof window is not covered with the sliding roof member when said one roof window is open.

The roof system in accordance with the present invention is characterized in that the sliding roof member which covers one of the forward and rearward roof windows is positioned on the side of the other roof window remote therefrom at least when both the roof windows are open.

Generally, the forward roof window is provided with the sliding roof member though it need not necessarily be limited to the forward roof window. When the forward roof window is provided with the sliding roof member, the sliding roof member is positioned on the rear side of the rearward roof window at least when both the forward and rearward roof windows are open. When the forward roof window is open and the rearward roof window closed, the sliding roof member may be positioned over the rearward roof window. The rearward roof window may be provided with any type of roof member. For example, it may be provided with a sliding roof member which slides rearward when the rearward roof window is opened, a tilting roof member which tilts up when the rearward roof window is opened, a removable roof member which is removed from the roof when the rearward roof window is opened, or a fixed transparent roof member which is fixed to the roof and permanently covers the same.

DESCRIPTION OF THE PREFERRED EMBODIMENT

In FIGS. 1 to 9, a vehicle 1 is provided with a forward roof window 3 and a rearward roof window 4 which are formed in a roof 2 thereof. The forward and rearward roof windows 3 and 4 are respectively provided with forward and rearward sliding roof members 5 and 6 which slide rearward to open the windows 3 and 4. The forward sliding roof member 5 is slid back and forth in the longitudinal direction of the vehicle body by a motor unit 8 provided in a front header 7 of the roof 2. The rearward sliding roof member 6 is slid back and forth in the longitudinal direction of the vehicle body by a motor unit 10 provided in a rear header 9 of the roof 2. Reference numerals 38 and 39 respectively denote a windshield and a rear door.

Figure 5A:
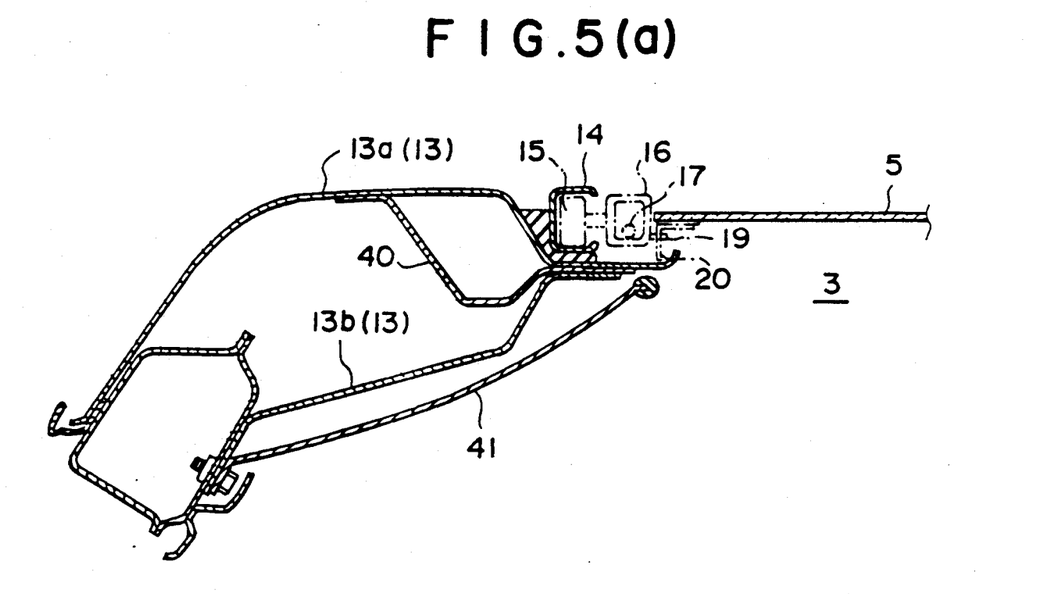
FIG. 5(a) is a cross-sectional view taken along line V—V in FIG. 3.
Figure 5B:
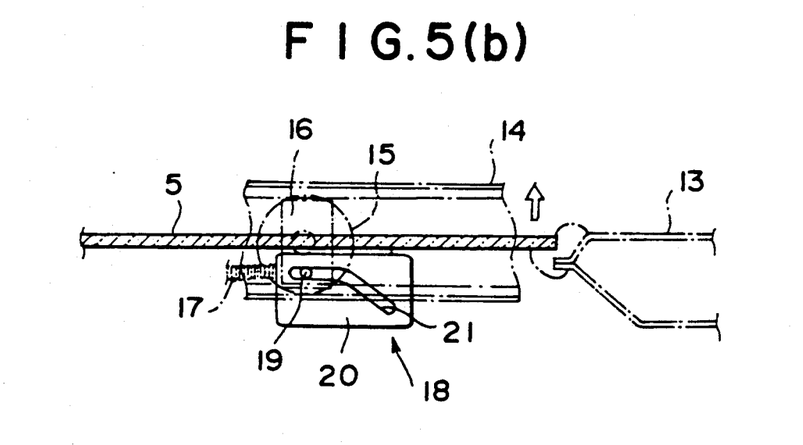
FIG. 5(b) is an enlarged fragmentary view showing the cam mechanism for the front slider.
Figure 6:
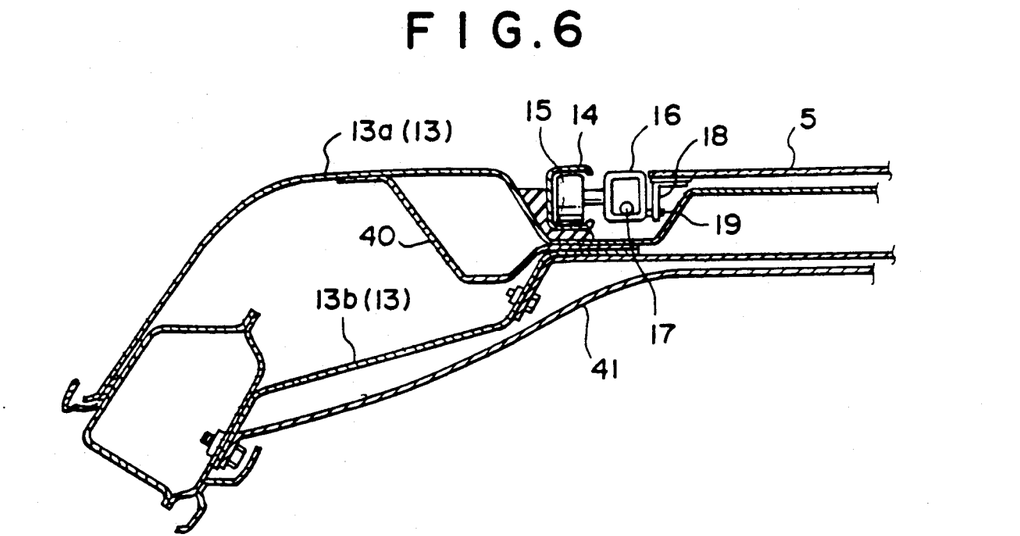
FIG. 6 is a cross-sectional view taken along line VI—VI in FIG. 4.
Figure 9:
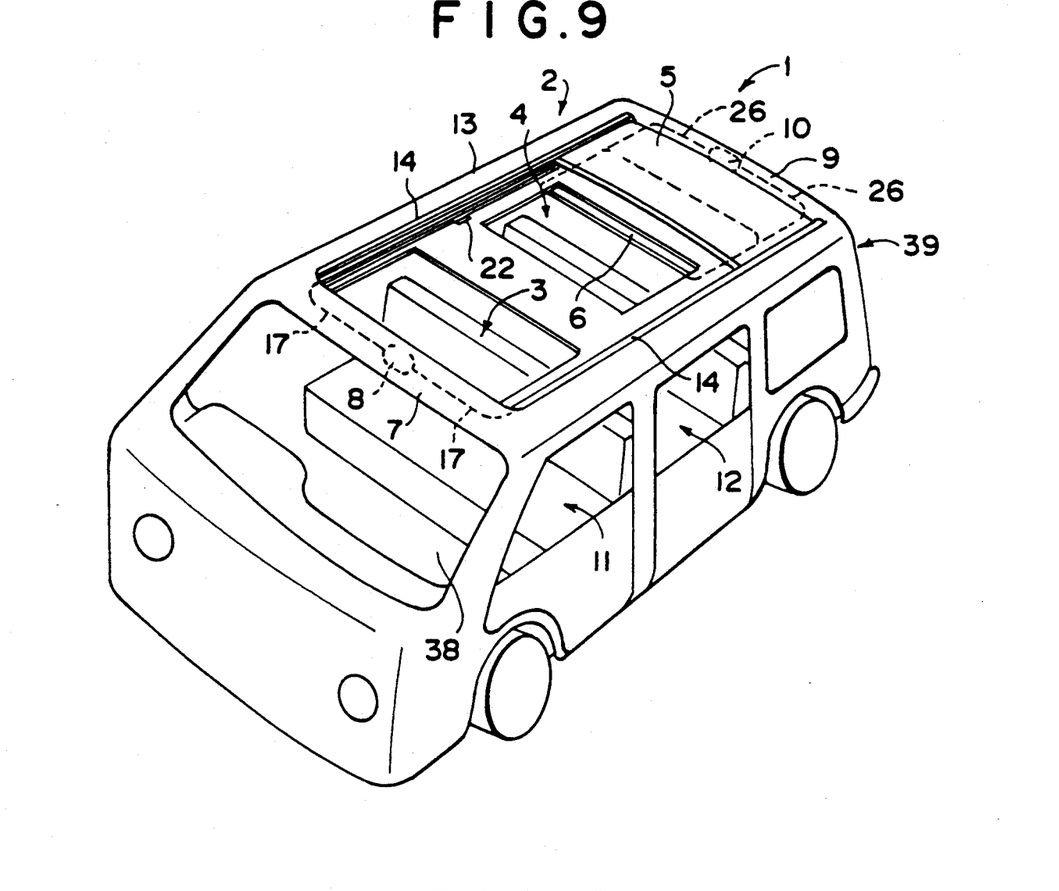
FIG. 9 is a perspective view showing a vehicle provided with a roof system in accordance with an embodiment of the present invention.

The forward sliding roof member 5 is made of transparent glass and is mounted on a pair of front sliders 16 on its respective side edges (FIGS. 5 and 6). The roof 2 is formed of a roof panel 13 which comprises an outer roof panel 13a and an inner roof panel 13b. Each of the side edges of the forward roof window 3 is reinforced with a reinforcement sandwiched between the outer roof panel 13a and the inner roof panel 13b. A guide rail 14 extends in the longitudinal direction of the vehicle body from the front end of the forward roof window 3 to the rear end of the roof 2 on each side of the forward roof window 3. Each front slider 16 is connected to a roller 15 which rolls along the guide rail 14. The front sliders 16 are connected to left and right drive tubes 17 which are operatively connected to the motor unit 8 so that the forward sliding roof member 5 is slid by the motor unit 8 as will be described in detail later. Each front slider 16 is provided with a cam mechanism 18 as clearly shown in FIG. 5(b). The cam mechanism 18 comprises a guide pin 19 fixed to the front slider 16 and a lifter 20 which is mounted on the forward sliding roof member 5 and is provided with a guide slit 21. The guide pin 19 is in engagement with the guide slit 21. When the guide pin 19 moves along the guide slit 21 at the beginning of rearward sliding motion of the forward sliding roof member 5, the rear end portion of the forward sliding roof member 5 is tilted up above the roof panel 13. As the forward sliding roof member 5 further slides rearward, it assumes a substantially horizontal position and is lifted above the roof panel 13 as shown in FIGS. 4 and 6 by a link mechanism (not shown) which is associated with the cam mechanism 18. Then the forward sliding roof member 5 slides rearward, remaining in its horizontal position. Reference numeral 41 in FIGS. 5(a) and 6 denotes the top sealing A position sensor 22 which detects the position of the forward sliding roof member 5 by way of the position of the front slider 16 is mounted along one of the guide rails 14 as shown in FIG. 9.

Figure 4:
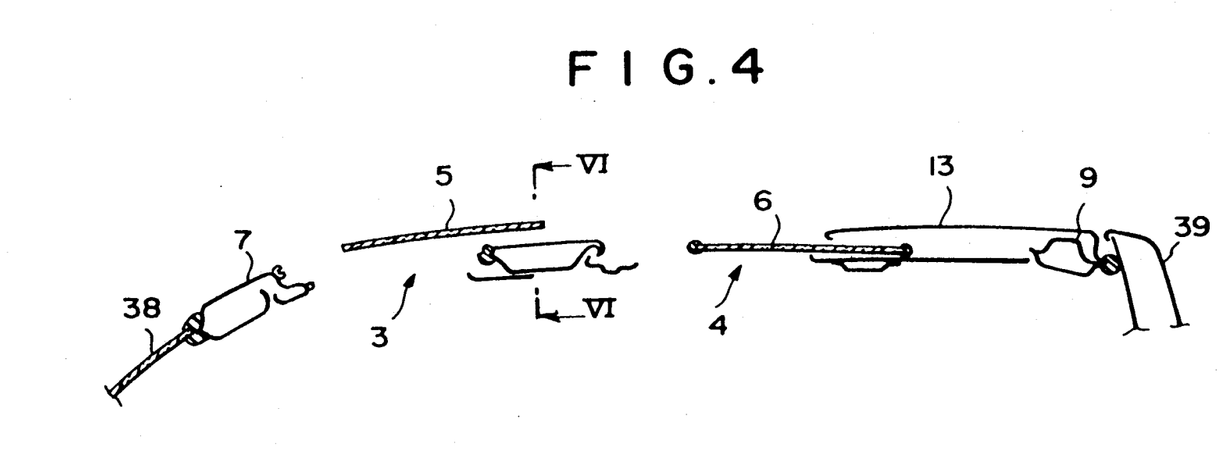
FIG. 4 is a schematic view showing the roof system with both the front and rear sliding roof members partly opens.
Figure 7A:
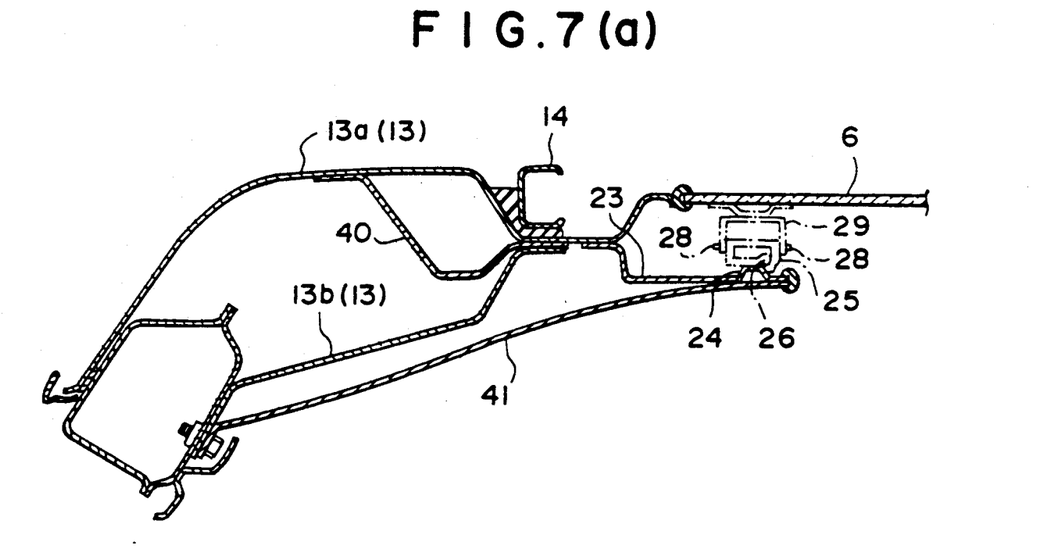
FIG. 7(a) is a cross-sectional view taken along line VII—VII in FIG. 3.
Figure 7B:
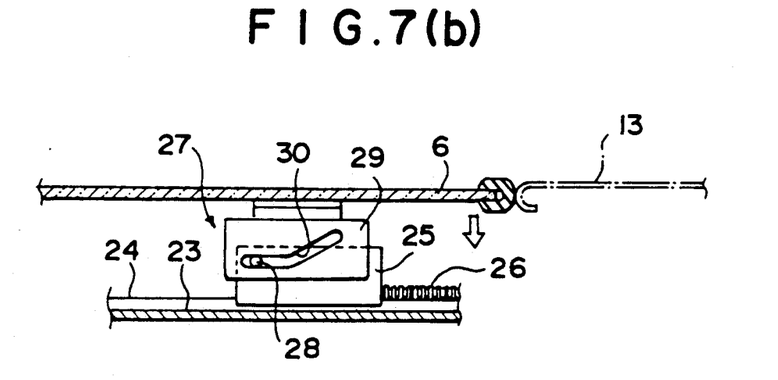
FIG. 7(b) is an enlarged fragmentary view showing the cam mechanism for the rear slider.
Figure 8:
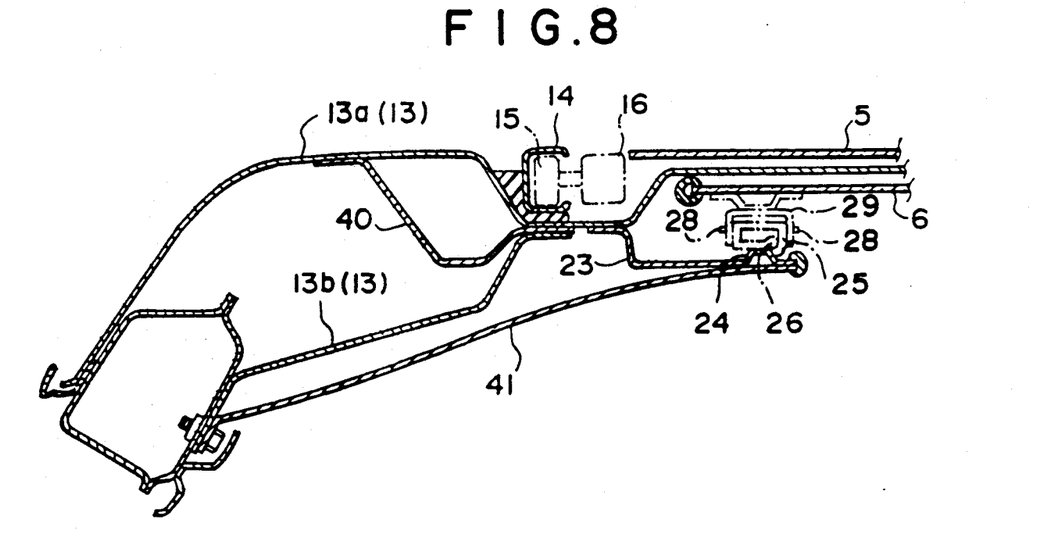
FIG. 8 is a cross-sectional view taken along line VIII—VIII in FIG. 1.

The rearward sliding roof member 6 which covers the rearward roof window 4 is formed of transparent glass and mounted on a pair of rear sliders 25 which slides along a pair of guide rails 24 as shown in FIGS. 7(a) and 8. Each of the guide rails 24 is formed in a frame 23 which extends inward from the roof panel 13, and extends in the longitudinal direction of the vehicle body on one side of the rearward roof window 4. The rear sliders 25 are connected to left and right drive tubes 26 which are operatively connected to the motor unit 10 so that the rearward sliding roof member 6 is slid by the motor unit 10 as will be described in detail later. Each rear slider 25 is provided with a cam mechanism 27 as clearly shown in FIG. 7(b). The cam mechanism 27 comprises a guide pin 28 fixed to the rear slider 25 and a lifter 29 which is mounted on the rearward sliding roof member 6 and is provided with a guide slit 30. The guide pin 28 is in engagement with the guide slit 30. When the guide pin 28 moves along the guide slit 30 at the beginning of rearward sliding motion of the rearward sliding roof member 6, the rear end portion of the rearward sliding roof member 6 is tilted down below the roof panel 13. As the rearward sliding roof member 6 further slides rearward, the rearward sliding roof member 6 is moved below the roof panel 13 as shown in FIGS. 4 and 8.

The mechanism for opening and closing the forward sliding roof member 5 is substantially the same as that for opening and closing the rearward sliding roof member 6, and accordingly, only the former will be described with reference to FIG. 10, hereinbelow.

Figure 10:
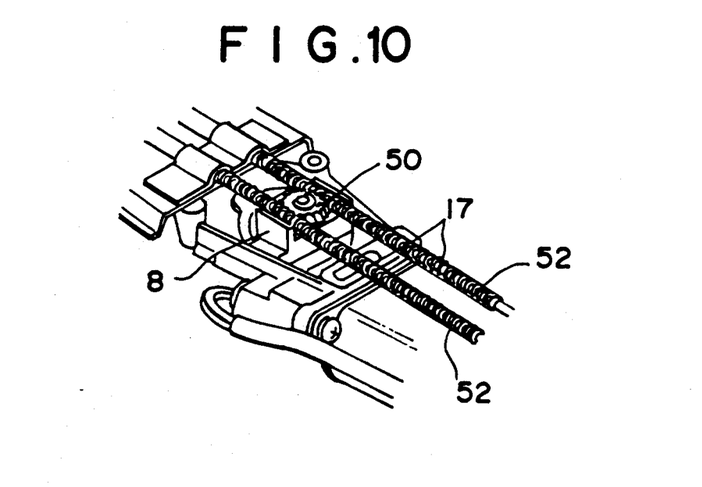
FIG. 10 is a perspective view showing the mechanism for opening and closing the forward sliding roof member.

In FIG. 10, a pinion 50 is fixed to the output shaft of the motor unit 8. The drive tubes 17 are respectively provided with racks 52 which are in mesh with the pinion 50 on opposite sides of the pinion 50 so that the drive tubes 17 are conveyed in opposite directions when the pinion 50 rotates. That is, when the pinion 50 rotates in the clockwise direction in FIG. 10, the drive tubes 17 are conveyed toward each other, and the forward sliding roof member 5 is moved toward the motor unit 8 in FIG. 9, i.e., the forward sliding roof member 5 is closed. On the other hand, when pinion 50 rotates in the counterclockwise direction in FIG. 10, the drive tubes 17 are conveyed away from each other, and the forward sliding roof member 5 is moved away from the motor unit 8 in FIG. 9, i.e., the forward sliding roof member 5 is opened. In the case of the rearward sliding roof member 6, the rearward sliding roof member 6 is closed when the drive tubes 26 are conveyed away from each other and opened when the drive tubes 26 are conveyed toward each other.

Figure 1:
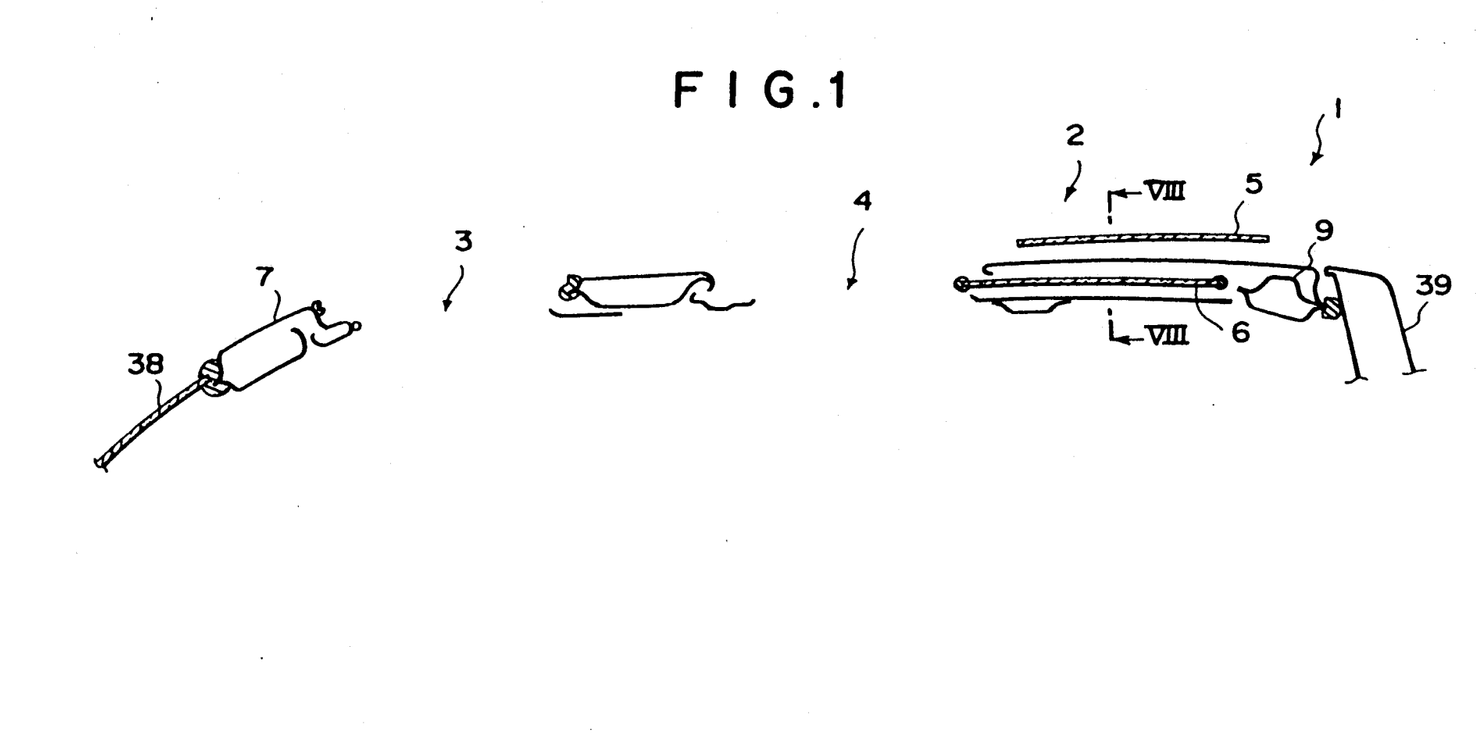
FIG. 1 is a schematic view showing a roof system in accordance with an embodiment of the present invention with both the front and rear roof windows wide open.
Figure 2:
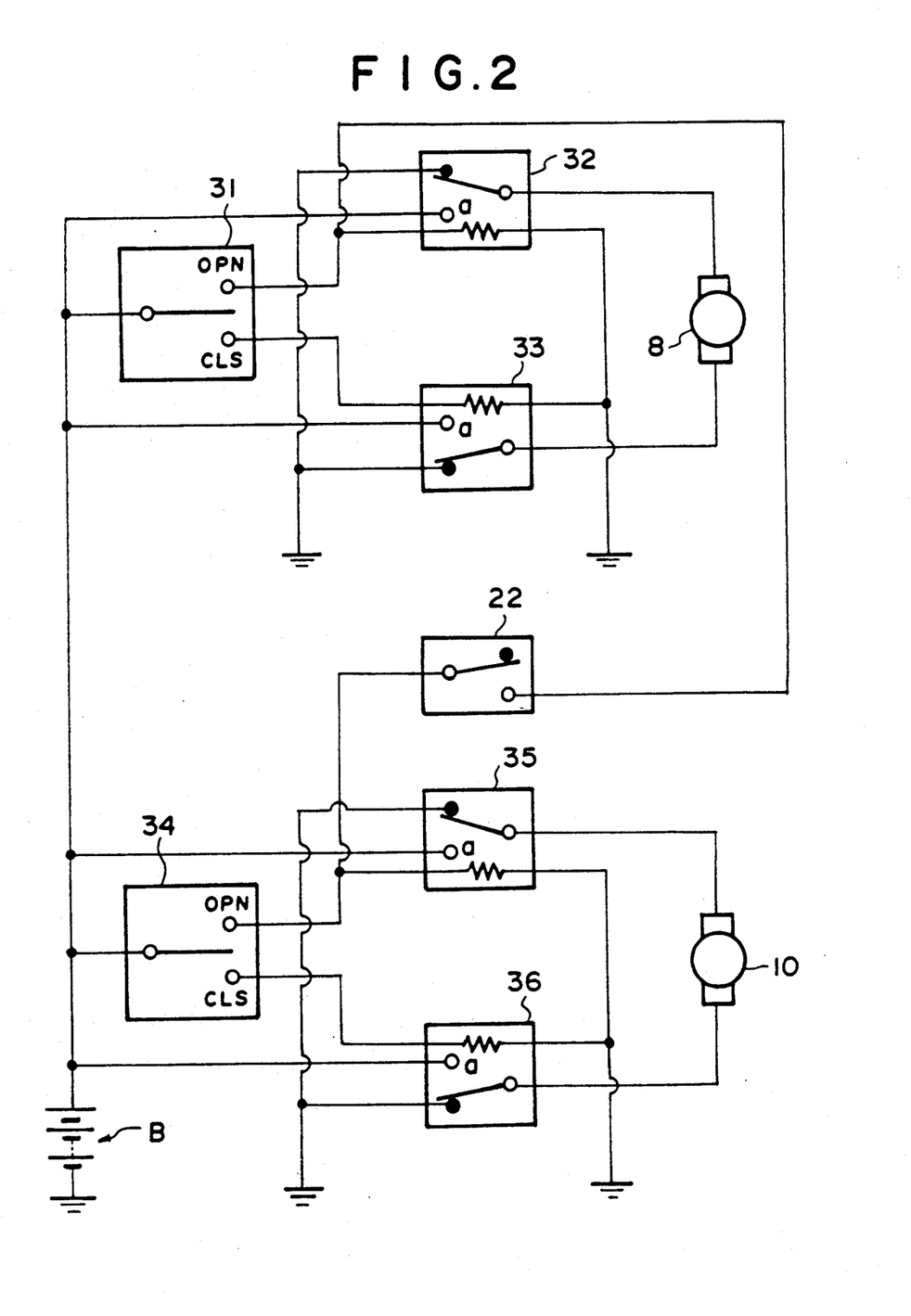
FIG. 2 is a view showing the electric circuit for driving the sliding roof members.

FIG. 2 shows the control circuit which controls the operation of the forward sliding roof member 5 and the rearward sliding roof member 6.

Figure 3A:
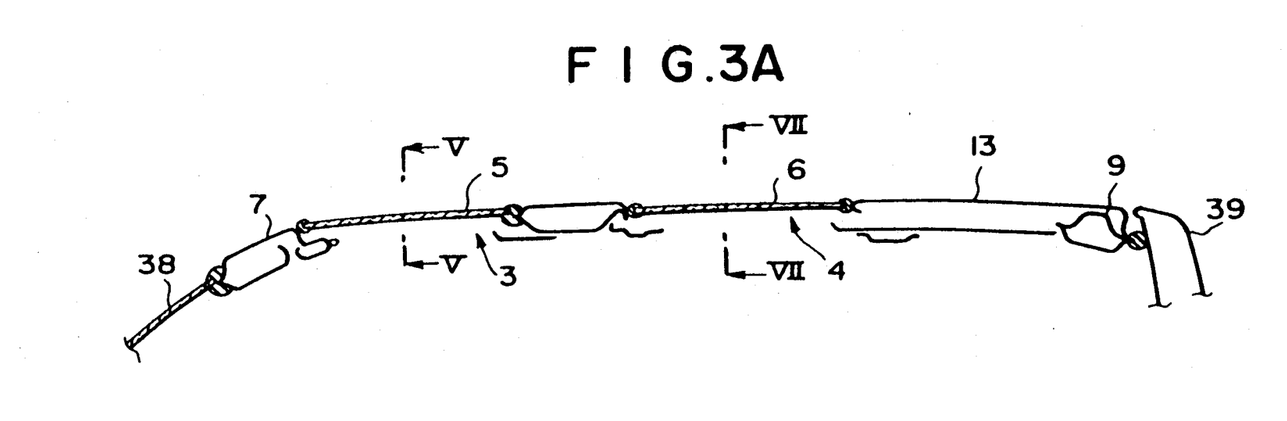
FIG. 3A is a schematic view showing the roof system with both the front and rear roof windows covered with the sliding roof members.
Figure 3B:
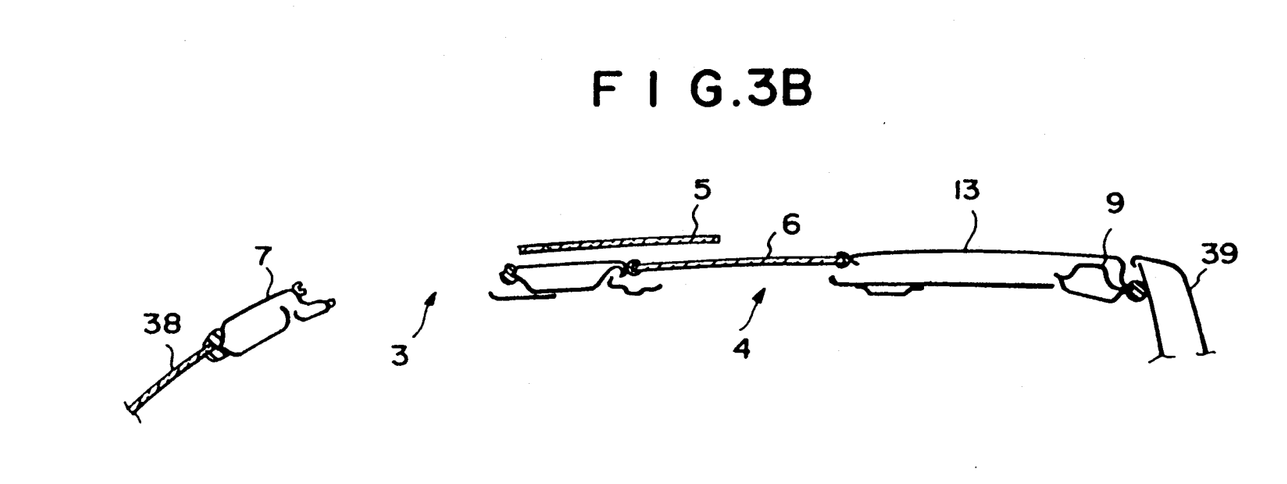
FIG. 3B is a schematic view showing the front window open and the rear window covered.

When an opening contact OPN of a forward roof switch 31 is closed, a relay 32 is energized by a battery B which is connected to the relay 32 by way of an ignition switch (not shown), and an a-contact of the relay 32 is closed, whereby the motor unit 8 is energized and rotates in the regular direction. When the motor unit 8 rotates in the regular direction, the forward sliding roof member 5 is slid rearward in the manner described above, which opens the forward roof window 3. As can be seen from FIG. 3B, a portion of the rearward sliding roof member 6 is covered by the forward sliding roof member 5. When a closing contact CLS of the forward roof switch 31 is thereafter closed, a relay 33 is energized and an a-contact of the relay 33 is closed, whereby the motor unit 8 is energized and rotates in the reverse direction. When the motor unit 8 rotates in the reverse direction, the forward sliding roof member 5 is slid forward and covers the forward roof window 3 as shown in FIG. 3A.

When an opening contact OPN of a rearward roof switch 34 is closed, a relay 35 is energized and an a-contact of the relay 35 is closed, whereby the motor unit 10 is energized and rotates in the regular direction. When the motor unit 10 rotates in the regular direction, the rearward sliding roof member 6 is slid rearward in the manner described above, which opens the rearward roof window 4. If the forward sliding roof member 5 is over the rearward roof window 4 when the opening contact OPN of a rearward roof switch 34 is closed, an a-contact of the position sensor 22 and the forward roof switch 32 is energized, whereby the forward sliding roof member 5 is further slid rearward together with the rearward sliding roof member 6. Thus, the rearward roof window 4 is opened and is not partly covered with the forward sliding roof member 5. When a closing contact CLS of the rearward roof switch 34 is thereafter closed, a relay 36 is energized and an a-contact of the relay 36 is closed, whereby the motor unit 10 is energized and rotates in the reverse direction so that the rearward sliding roof member 6 is slid forward and covers the rearward roof window 4.

Though, in the embodiment described above, the rearward roof member slides back and forth to open and close the rearward roof window 4, the rearward roof member may be a transparent roof member which is fixed to the roof panel 13 and permanently covers the rearward roof window 4, or may be a tilting roof member which is mounted on the roof panel 13 so that it can tilt up to partly open the rearward roof window 4. Further the tilting roof member may be arranged so that it can be removed from the roof panel 13.

Figures 11, 12, 13:
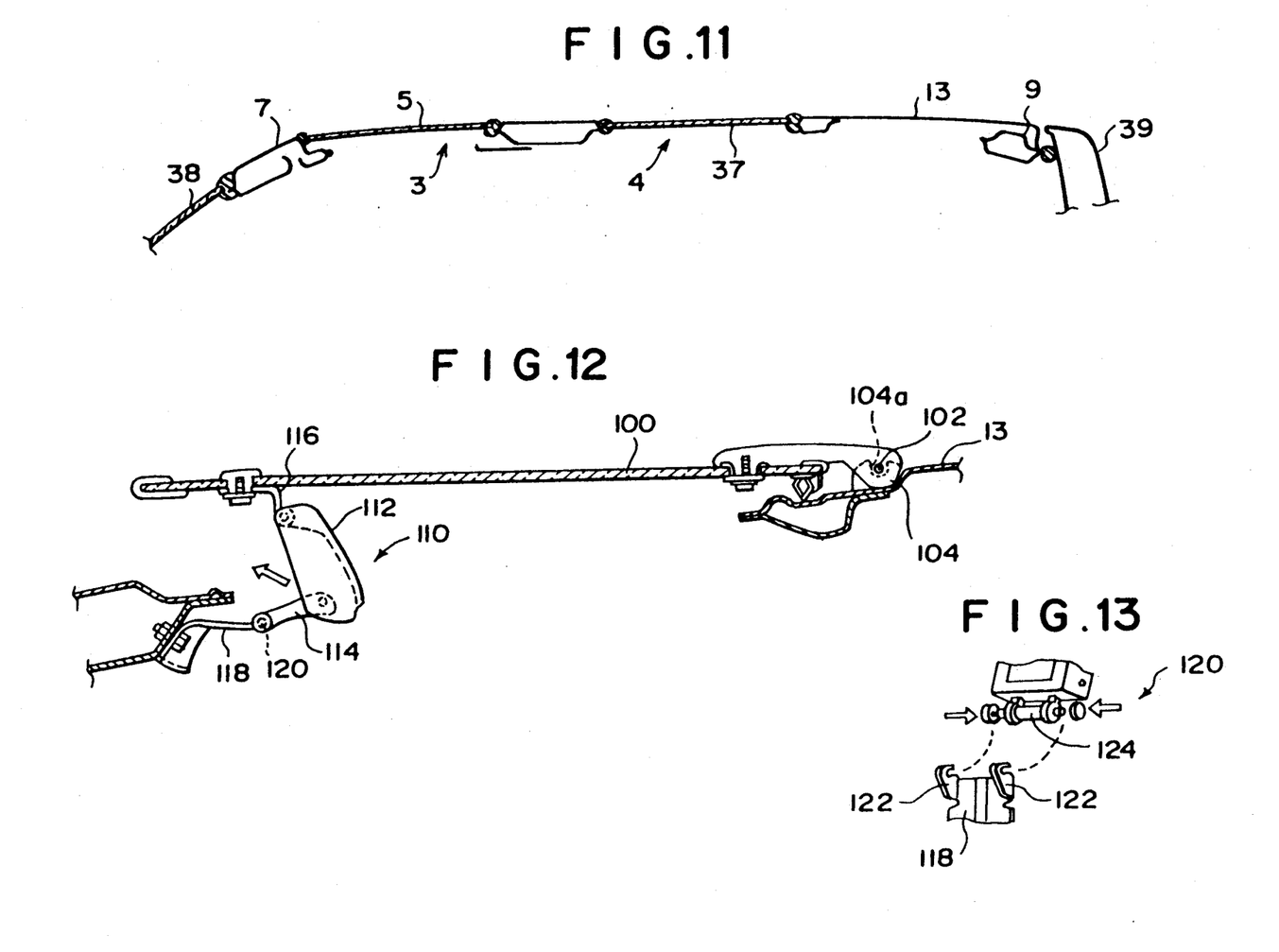
FIG. 11 is a view similar to FIG. 3 but showing a roof system in accordance with another embodiment of the present invention.
FIGS. 12 and 13 are fragmentary views for illustrating a roof system in accordance with still another embodiment of the present invention.

FIG. 11 shows another embodiment of the present invention in which the rearward roof member is a transparent roof member which is fixed to the roof panel and permanently covers the rearward roof window. In FIG. 11, reference numeral 37 denotes the transparent roof member which is fixed to the roof panel 13. In this case, the forward sliding roof member 5 is arranged such that it can be slid in a rearward direction beyond the rear edge of the rearward roof window 4. The forward sliding roof member 5 may be slid beyond the rear edge of the rearward roof window 4 whenever the forward roof window 3 is opened wide or may be slid beyond the rear edge of the rearward roof window 4 when desired.

FIGS. 12 and 13 show still another embodiment of the present invention in which the rearward roof member is a tilting roof member which is mounted on the roof panel 13 so that it can tilt up to partly open the rearward roof window 4 and so that it can be removed from the roof panel 13. In FIG. 12, a tilting roof member 100 which covers the rearward roof window 4 is supported on the roof panel 13 so that it can be swung up and down about a shaft 102 which is fixed to the rear edge thereof and is rotatably received in a recess 104a formed in a bearing roof 104. The bearing 104 is fixed to the roof panel 13. The front edge of the tilting roof member 100 is connected to the roof panel 13 by way of a link mechanism 110. The link mechanism 110 comprises first and second arm members 112 and 114 which are rotatably connected together at their inner ends. The other end or the outer end of the first arm member 112 is rotatably connected to a support bracket 116 which is fixed to the front edge portion of the tilting roof member 100. The other end or the outer end of the second arm member 114 is rotatably connected to a support bracket 118 by way of a releasable hinge mechanism 120. When the tilting roof member 100 is in the closed position, in which it completely covers the rearward roof window 4, the link mechanism 110 is in the folded position, in which the outer ends of the first and second arm members 112 and 114 are positioned close to each other. When the tilting roof member 100 is manually lifted, the first and second arm members 112 and 114 are rotated relative to each other so that the outer ends are moved away from each other while the inner ends are moved together in the direction of the arrow in FIG. 12, and when the inner ends are moved beyond the position at which the first and second arm members 112 and 114 are aligned with each other, the link mechanism 110 comes to hold the tilting roof member 100 so that it cannot fall down even if it is released. As shown in FIG. 13, the releasable hinge mechanism 120 comprises a pair of hook portions 122 formed on the end of the support bracket 118 and a pair of retractable hinge pins 124 which are mounted on the outer end of the second arm member 114 and are brought into engagement with the hook portions 122. The retractable hinge pins 124 are provided with a large diameter portion and a small diameter portion and are urged outward by a spring (not shown) toward a projecting position where the large diameter portions project outside. Each of the hook portions 122 has an engaging recess which is narrow at the entrance and wide at the base portion. Normally, the large diameter portions of the hinge pins 124 are received in the base portions of the engaging recesses, and the narrow entrances prevent the hinge pins 124 from being disengaged from the hook portions 122. When the retractable hinge pins 124 are pushed inward, the small diameter portions come to be in the engaging recesses, and the hinge pins 124 can be disengaged from the hook portions 122. When the tilting roof member 100 is swung to the vertical position after the hinge pins 124 are disengaged from the hook portions 122 and is lifted upward, the shaft 102 is disengaged from the recess 104a in the bearing 104, and the tilting roof member 100 can be removed from the roof panel 13.

Also in this embodiment, the forward sliding roof member 5 may be slid beyond the rear edge of the rearward roof window 4 whenever the forward roof window 3 is opened wide or may be slid beyond the rear edge of the rearward roof window 4 whenever it is desired to do so.

I claim:

1. A roof system for a vehicle comprising
a forward roof opening and a rearward roof opening,
at least one of the forward and the rearward roof openings being opened and closed by means of a sliding roof member,
an actuator means for moving the sliding roof member, and
a control means for controlling the actuator means so that the sliding roof member opens said at least one of the forward and rearward roof openings and covers at least a part of the other roof opening, wherein the sliding roof member can be slid beyond the other roof opening to a position remote from said at least one roof opening.

2. A roof system as defined in claim 1 in which said one of the forward and rearward roof openings is the forward roof opening and said sliding roof member is controlled by the control means to slide rearward to open the forward roof opening and forward to close the same.

3. A roof system as defined in claim 2 in which the rearward roof opening is covered with a transparent roof member which is fixed to a roof panel of the vehicle.

4. A roof system as defined in claim 2 in which the rearward roof opening is covered with a roof member which is mounted by means on a roof panel of the vehicle so that it can tilt up to open the rearward roof opening.

5. A roof system as defined in claim 4 in which the roof member which covers the rearward roof opening is transparent.

6. A roof system as defined in claim 4 in which the tiltable roof member is mounted on the roof panel of the vehicle so that it can be removed from the roof panel to open the rearward roof opening.

7. A roof system as defined in claim 6 in which the roof member which covers the rearward roof opening is transparent.

8. A roof system for a vehicle comprising
a forward roof opening and a rearward roof opening,
a forward sliding roof member for opening and closing the forward roof opening,
a rearward sliding roof member for opening and closing the rearward roof opening,
an actuator means for moving the forward sliding roof member and the rearward sliding roof member, and
a control means for controlling the actuator means so that one of the forward and rearward sliding roof members can be slid together with the other of the forward and rearward sliding roof members in response to the sliding movement of the other sliding roof member so as to completely open both the roof openings when said one of the forward and rearward sliding roof members is in the position in which said one of the forward and rearward sliding roof members completely opens its respective roof opening but covers at least a part of the other roof opening.

9. A roof system as defined in claim 8 in which said one of the forward and rearward sliding roof members is the forward sliding roof member, and the one of said roof openings is the forward roof opening.

10. A roof system as defined in claim 8 in which said forward roof opening and said rearward roof opening are widely opened so that a roof portion between these roof openings is narrower than each of these roof openings in a width of a back and forth direction.

11. A roof system as defined in claim 9 in which said forward sliding roof member slides rearward to open the forward roof opening and slides forward to close the same.

12. A roof system as defined in claim 11 in which said rearward sliding roof member slides rearward to open the rearward roof opening and slides forward to close the same.

* * * * *